(12) United States Patent  
Kim et al.

(10) Patent No.: US 11,968,525 B2  
(45) Date of Patent: Apr. 23, 2024

(54) VEHICLE DIGITAL KEY SHARING SERVICE METHOD AND SYSTEM

(71) Applicant: KSMARTECH CO., LTD, Seoul (KR)

(72) Inventors: Seong Won Kim, Incheon (KR); Jae Hyung Hwang, Seongnam-si (KR)

(73) Assignee: KSMARTECH CO., LTD, Seoul (KR)

( * ) Notice: Subject to any disclaimer, the term of this patent is extended or adjusted under 35 U.S.C. 154(b) by 278 days.

(21) Appl. No.: 17/686,116

(22) Filed: Mar. 3, 2022

(65) Prior Publication Data

US 2022/0191692 A1    Jun. 16, 2022

Related U.S. Application Data

(63) Continuation of application No. 16/477,030, filed as application No. PCT/KR2019/004795 on Apr. 20, 2019, now Pat. No. 11,330,429.

(51) Int. Cl.
    *H04W 12/0431*      (2021.01)
    *B60R 25/01*      (2013.01)
    (Continued)

(52) U.S. Cl.
    CPC ......... *H04W 12/0431* (2021.01); *B60R 25/01* (2013.01); *B60R 25/24* (2013.01);
    (Continued)

(58) Field of Classification Search
    CPC ........ G06Q 50/40; B60R 25/24; B60R 25/01; B60R 25/34; G07C 9/00309; G07C 9/00857; G07C 9/00896; G07C 9/00571;
G07C 9/00817; G06F 3/0482; H02J 50/10; H02J 50/80; H04L 9/0825; H04L 9/0894; H04L 9/0861; H04L 9/0891; H04L 9/30;
(Continued)

(56) References Cited

U.S. PATENT DOCUMENTS 9,252,951 B1 *    2/2016    Katzer ............... G07C 9/00571  
9,365,188 B1 *    6/2016    Penilla .................. G06Q 30/00  
(Continued)

FOREIGN PATENT DOCUMENTS

CN      108944794 A    12/2018  
JP      2003-041825 A    2/2003  
(Continued)

*Primary Examiner* — Yong Hang Jiang  
(74) *Attorney, Agent, or Firm* — NKL LAW; Jae Youn Kim

(57) ABSTRACT

The vehicle digital key sharing service method according to one embodiment includes a digital registration step in which a management server generates a terminal digital key and a vehicle digital key after user authentication in response to a digital key registration request through a dedicated application of a mobile terminal and the mobile terminal stores the terminal digital key in a secure world that is separated from a normal world and a digital key using step in which an authentication token is generated using the terminal digital key stored in the secure world when the mobile terminal approaches or tags a vehicle and a vehicle device locks or unlocks a door of the vehicle by activating the vehicle digital key, which is registered from the management server, to validate the authentication token.

11 Claims, 14 Drawing Sheets

(51) Int. Cl.
*B60R 25/24* (2013.01)
*G06Q 50/30* (2012.01)
*G06Q 50/40* (2024.01)
*H04L 9/08* (2006.01)
*H04L 9/30* (2006.01)
*H04W 12/03* (2021.01)
*H04W 12/041* (2021.01)
*H04W 12/06* (2021.01)
*H02J 7/00* (2006.01)
*H02J 7/02* (2016.01)

(52) U.S. Cl.
CPC ........... *G06Q 50/40* (2024.01); *H04L 9/0825* (2013.01); *H04L 9/0891* (2013.01); *H04L 9/0894* (2013.01); *H04L 9/30* (2013.01); *H04W 12/03* (2021.01); *H04W 12/041* (2021.01); *H04W 12/06* (2013.01); *B60R 2325/205* (2013.01); *H02J 7/00045* (2020.01); *H02J 7/02* (2013.01); *H04L 2209/80* (2013.01); *H04L 2209/84* (2013.01)

(58) Field of Classification Search
CPC .... H04L 9/3213; H04L 9/0897; H04W 12/06; H04W 12/03; H04W 4/60; H04W 12/069; H04W 12/041; H04W 12/086; H04W 12/0431

See application file for complete search history.

(56) References Cited

U.S. PATENT DOCUMENTS

| | | |
|---|---|---|
| 2003/0149666 A1 | 8/2003 | Davies |
| 2016/0118839 A1 | 4/2016 | Lee |
| 2017/0104589 A1 | 4/2017 | Lambert et al. |
| 2017/0213206 A1* | 7/2017 | Shearer .................. G06Q 20/10 |
| 2018/0186333 A1* | 7/2018 | Santiano ............... H04W 12/08 |
| 2018/0326947 A1 | 11/2018 | Oesterling et al. |
| 2019/0106084 A1* | 4/2019 | Matsuyama ............ B60R 25/24 |
| 2021/0398369 A1* | 12/2021 | Suzuki ............. H04W 12/0433 |

FOREIGN PATENT DOCUMENTS

| | | |
|---|---|---|
| JP | 2012-079109 A | 4/2012 |
| JP | 2014-080165 A | 5/2014 |
| KR | 10-1757214 B1 | 7/2017 |

* cited by examiner

VEHICLE DIGITAL KEY SHARING SERVICE METHOD AND SYSTEM

CROSS-REFERENCE TO RELATED APPLICATIONS

This application is a continuation of U.S. application Ser. No. 16/477,030 filed Jul. 10, 2019, which is a national stage application of PCT/KR2019/004795 filed Apr. 20, 2019, which is incorporated herein by reference in its entirety.

TECHNICAL FIELD

The present invention relates to a digital key sharing service method and system, and more specifically, to a vehicle digital key sharing service method and system which can improve user convenience while securing security of a digital key by providing a master-slave digital key sharing service which allows a user-specific access right to be set using a mobile terminal operated in a normal operating system and a secure operating system.

BACKGROUND ART

Recently, as wireless communication technology has rapidly developed, a non-contact type digital key technology for remote unlocking using various short-range wireless communication technologies including near field communication (NFC), Bluetooth, ZigBee, beacon, and WiFi has drawn attention in various fields.

Digital key technology has been applied to all industrial fields including a driver's door of a vehicle to be unlocked, a front door of a home, a company entrance door, and a hotel room door, and a main body for wireless door key to generate an unlock signal is mostly required.

For example, in a case where a digital key is applied to a vehicle, when a driver carrying a main body for wireless door key that has an independent body and generates an unlock signal is located within a predetermined distance from the vehicle, an unlock driving unit mounted in a driver's door of the vehicle is automatically responsive to the unlock signal and opens the driver's door, and in a similar manner, it is possible to open doors installed in various places.

That is, in order to unlock a door using a digital key, a main body for wireless door key has to be carried, and anyone who carries the main body for wireless door key can open a corresponding door.

As described above, the method of unlocking a door using a main body for wireless door key may allow anyone who carries the main body for wireless door key to have all access rights and thus when the main body for wireless door key is handed to another person for personal convenience, such as valet service or hotel service, the main body for wireless door key is out of control of a primary user until the main body for wireless door key is returned, and there is a problem in that the user may be worried about the possibility of theft when the main body for wireless door key has been lost.

Meanwhile, attempts have been made to wirelessly control a target to be unlocked using an application installed in a mobile terminal, such as a smartphone, with the recent development of information communication technology.

However, even when a door is unlocked using a mobile terminal, such as a smartphone, there is a problem in that the mobile terminal together with the digital key in accordance with the above-described related art has to be handed to another user, and accordingly, problems arise in that a risk of theft increases and it is difficult to secure security for the digital key in the course of user registration of the digital key during installation of an application.

Therefore, there is an urgent need for a practical and applicable digital key technology which allows for sharing a digital key and secures security for a digital key while fundamentally preventing the possibility of theft even when the digital key is lost.

Technical Problem

The present invention is devised to solve the above-described problems, and is directed to providing a vehicle digital key sharing service method and system which can improve user convenience while securing security of a digital key by providing a master-slave digital key sharing service which allows a user-specific access right to be set using a mobile terminal operated in a normal operating system and a secure operating system.

Technical Solution

The present invention provides a vehicle digital key sharing service method including a digital registration step in which a management server generates a terminal digital key and a vehicle digital key after user authentication in response to a digital key registration request through a dedicated application of a mobile terminal and the mobile terminal stores the terminal digital key in a secure world that is separated from a normal world and a digital key using step in which an authentication token is generated using the terminal digital key stored in the secure world when the mobile terminal approaches or tags a vehicle, and a vehicle device locks or unlocks a door of the vehicle by activating the vehicle digital key, which is registered from the management server, to validate the authentication token.

The digital key registration step may include a step of registering the digital key in a mobile terminal-based relay mode in which on behalf of the vehicle device the mobile terminal relays registration of the vehicle digital key through authentication by the management server and a step of registering the digital key in a vehicle device-based telematics support mode in which each of the vehicle device and the mobile terminal processes registration of their own digital keys through authentication by the management server.

The step of registering the digital key in a mobile terminal-based relay mode may include receiving and storing, by the mobile terminal accessing the management server through the dedicated application, a server public key from the management server and generating a terminal public key and a terminal private key, forwarding, by the mobile terminal, the terminal public key to the vehicle device and decrypting encrypted vehicle information using the terminal private key after receiving the vehicle information encrypted using the terminal public key from the vehicle device, encrypting, by the mobile terminal, the vehicle information and terminal information using the server public key and then transmitting the encrypted vehicle information and terminal information to the management server, decrypting, by the management server, the information received from the mobile terminal, encrypting the digital key using each of a vehicle public key included in the vehicle information and the terminal public key included in the terminal information, and transmitting the encrypted digital keys to the mobile terminal, receiving, by the mobile terminal, the encrypted vehicle digital key and the encrypted terminal digital key from the management server, transmitting the vehicle digital key to the vehicle device, decrypting the terminal digital key, and storing the decrypted terminal digital key in the secure world, and receiving, by the vehicle device, the vehicle digital key and decrypting and storing the vehicle digital key.

The step of registering the digital key in a vehicle device-based telematics support mode may include receiving and storing, by the mobile terminal accessing the management server through the dedicated application, a server public key from the management server and generating a terminal public key and a terminal private key, forwarding, by the mobile terminal, a server public key to the vehicle device, encrypting, by the vehicle device, vehicle information with the server public key and transmitting the encrypted vehicle information to the management server, encrypting, by the mobile terminal, terminal information with the server public key and transmitting the encrypted terminal information to the management server, decrypting, by the management server, the information received from the mobile terminal, encrypting the digital key using each of a vehicle public key included in the vehicle information and a terminal public key included in the terminal information, and then transmitting the vehicle digital key to the vehicle device and transmitting the terminal digital key to the mobile terminal, receiving, by the mobile terminal, the encrypted terminal digital key from the management server, decrypting the received terminal digital key, and storing the decrypted terminal digital key in the secure world, and receiving, by the vehicle device, the encrypted vehicle digital key from the management server and decrypting and storing the received vehicle digital key.

The secure world of the mobile terminal may correspond to a mobile secure area using one of a trusted execution environment (TEE), white box cryptography (WBC), universal subscriber identity module (USIM), and embedded subscriber identity module (eSIM).

The vehicle digital key sharing service method may further include a step in which a digital key sharing mode is activated via a dedicated application of a master terminal used by a primary user who owns a digital key, a restriction on unlock authority for the vehicle device is set by performing identification verification and authentication, and a digital key to which a restriction value is applied is shared with a shared terminal used by a sharer.

The step of sharing the digital key may include receiving, by the master terminal, an input selection of a menu for sharing a digital key through a dedicated application, performing a primary authentication process for a door key sharing service through the dedicated application of the master terminal by using an identity verification means stored in a secure world, performing a secondary authentication process for a door key sharing service using a compound authentication method in which authentication is performed via an identity verification means in the management server through the dedicated application of the master terminal, setting the restriction value for the digital key stored in the secure world of the master terminal, receiving a selected shared terminal to share the digital key and forwarding the restriction value for the digital key and information on the shared terminal to the management server, and storing, by the management server, the restriction value for the digital key and the information on the shared terminal and transmitting a digital key sharing message to the shared terminal.

The step of sharing the digital key may include receiving, by the master terminal, an input selection of a menu for sharing a digital key through the dedicated application, performing a primary authentication process for a door key sharing service with an identity verification means stored in the secure world through the dedicated application of the master terminal, performing a secondary authentication process for a door key sharing service using a compound authentication method in which authentication is performed via an identity verification means in the management server through the dedicated application of the master terminal, generating a restriction value for the digital key stored in a secure world of the master terminal, forwarding, by the master terminal, the digital key and the restriction value for the digital key to a shared terminal to share the digital key, storing, by the shared terminal, the digital key received from the master terminal, and forwarding, by the master terminal, a result of sharing to the management server.

The vehicle digital key sharing service method may further include a step of deleting or changing a shared digital key through a dedicated application, wherein the step of deleting or changing the digital key includes checking, by a master terminal, a digital key sharing list through the dedicated application, performing a primary authentication process for a door key sharing service using an identity verification means stored in a secure world through the dedicated application of the master terminal, performing a secondary authentication process for a door key sharing service using a compound authentication method in which authentication is performed via an identity verification means in the management server through the dedicated application of the master terminal, receiving, by the master terminal, a request signal for deleting or changing a predetermined digital key in the digital key sharing list and requesting the management server to delete or change the corresponding digital key, and changing or deleting, by the management server, a digital key of a shared terminal which has shared a digital key requested to be deleted or changed.

The vehicle digital key sharing service method may further include, in case of the vehicle device supporting telematics, changing or deleting, by the vehicle device, the digital key in response to a request of the management server to change or delete the digital key.

The present invention also provides a vehicle digital key sharing service system including a management server configured to manage registration, issuance, and disposal of a digital key for a digital key sharing service including locking and unlocking of a door of a vehicle device, a mobile terminal configured to receive a terminal digital key issued through authentication by the authentication server, store the terminal digital key in a secure world, and share the digital key with a shared terminal by setting an authority restriction, and the vehicle device configured to receive a vehicle digital key issued through authentication by the management server and store the vehicle digital key therein.

The vehicle device may include an authentication controller configured to recognize the mobile terminal as the mobile terminal approaches the vehicle device, receive a public key for encryption from the recognized mobile terminal, encrypt vehicle information using the received public key and decrypt and store a received encrypted vehicle digital key and a telematics controller directly connected to the management server over a network and configured to transmit the encrypted vehicle information to the management server and receive an encrypted vehicle digital key from the management server.

The authentication controller may be a mountable wireless charging pad that charges electric power by receiving a wireless power signal from the mobile terminal.

The mobile terminal may include a master terminal configured to set restriction on unlock authority for the vehicle device through identification verification and authentication in response to receiving an input selection of a menu for sharing a digital key through a dedicated application and share a digital key to which a restriction value is applied with a shared terminal and the shared terminal configured to share the digital key with the master terminal.

The master terminal may forward the digital key to the shared terminal via the management server or directly accesses the shared terminal to forward the digital key to the shared terminal in a short-range wireless communication manner when the digital key to which the restriction value is applied is shared with the shared terminal and the restriction value may include a usable period, the number of usable times, a usable area, and re-sharable information.

Additional features of the invention will be set forth in the description which follows, and in part will be apparent from the description, or may be learned by practice of the invention.

Advantageous Effects

As described above, the present invention is directed to providing a vehicle digital key sharing service method and system which can improve user convenience while securing security of a digital key by providing a master-slave digital key sharing service which allows a user-specific access right to be set using a mobile terminal operated in a normal operating system (OS) and a secure OS.

In addition, the present invention has an effect in that security for a digital key capable of unlocking a door of a vehicle device can be secured by decrypting and storing an encrypted digital key received from the management server in a secure OS using a mobile security environment-based mobile terminal.

In addition, according to the present invention, in case where the vehicle device supports telematics, the vehicle device can directly access the management server without relay of the mobile terminal and have a vehicle digital key registered.

Moreover, the present invention has an effect in that unlock authority can be restricted with various conditions through a sharing application that enables sharing of a digital key of the vehicle device and thereby it is possible to safely share the digital key with another user while improving user convenience.

Also, the present invention has an effect in that a compound authentication method is used in which authentication is performed via one or more identity verification means at the time of user authentication by the management server in the course of registering the digital key and a digital key which is encrypted using an asymmetric key algorithm and is received from the management server is decrypted in a secure world of the mobile terminal so that security of a digital can be enhanced even when the digital key is forwarded and received online.

In addition, the present invention has an effect in that the authentication token encryption/decryption process is performed and thereby leakage of the digital key can be fundamentally prevented even when the door of the vehicle device is unlocked using a digital key stored in the secure world of the mobile terminal.

In addition, the present invention has an effect in that double authentication is performed when a digital key is shared with another user through a dedicated application and thereby the digital key is prevented from being shared against the user's will.

Further, the present invention has an effect in that the digital key can is forwarded in cooperation with the management server or is forwarded through direct connection with a shared terminal of another user when the digital key is shared with the other user so that the user convenience and utility can be increased.

Additionally, the present invention has an effect in that safety can be increased as the security authentication process for the shared terminal to share a digital key is performed through the management server.

In addition, the present invention has an effect in that security is enhanced by optionally adding an operation in which the master terminal transmits a specific code to a shared terminal when forwarding the digital key to another user in cooperation with the management server.

Also, the present invention has an effect in that even when a digital key stored in a shared terminal is used, an authentication token is generated in a secure OS using the digital key and goes through the encryption/decryption process together with a restriction value and thereby the security required when sharing the digital key can be secured.

Moreover, the present invention has an effect of simultaneously increasing security and encryption/decryption processing speed by implementing an encryption algorithm that passes through the encryption/decryption process using a symmetric key derived from the digital key.

Furthermore, the present invention has an effect in that a digital key is shared with another user by including a usable period, the number of usable times, a usable area, and the redistribution right so that the risk of theft of a vehicle device can be minimized even when the digital key is lost.

DESCRIPTION OF DRAWINGS

The accompanying drawings, which are included to provide a further understanding of the invention and are incorporated in and constitute a part of this specification, illustrate embodiments of the invention, and together with the description serve to explain the principles of the invention.

MODE FOR INVENTION

Hereinafter, embodiments of the present invention will be described with reference to accompanying drawings.

Figure 1:
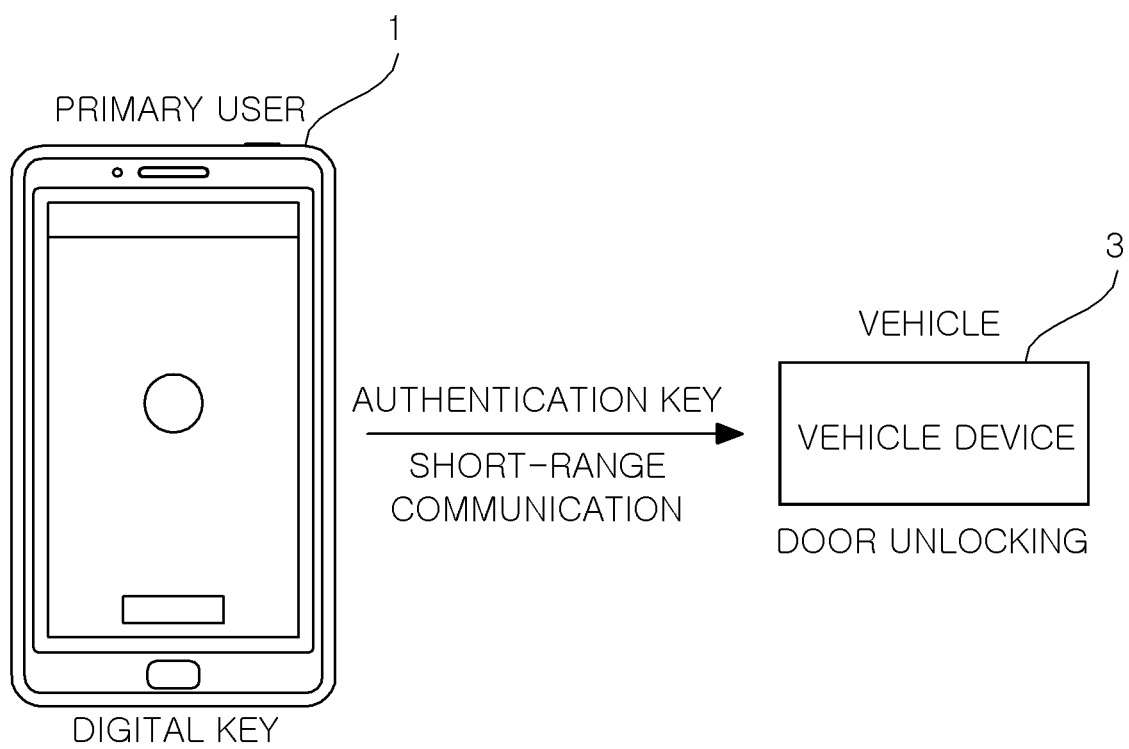
FIG. 1 is a diagram for describing a digital key sharing service using a mobile terminal in a mobile trusted environment according to one embodiment of the present invention.

FIG. 1 is a diagram for describing a digital key sharing service using a mobile terminal in a mobile trusted environment according to one embodiment of the present invention.

As shown in FIG. 1, in the digital key sharing service according to one embodiment of the present invention, a digital key that is capable of unlocking a door of a vehicle device 3 with a digital key scheme is provided inside a mobile terminal 1, such as a smartphone which is widely used with development of mobile communication technology, and the digital key is allowed to be shared with a shared terminal, which is another mobile terminal, by setting an authority restriction, thereby improving user convenience.

The digital key is a key encrypted and stored in a secure area of the mobile terminal 1 and the door of a vehicle may be unlocked with the key. The digital key scheme may use radio frequency (RF) wireless communication, which is recently widely used, such as near field communication (NFC), Bluetooth, WiFi, and ZigBee. The vehicle device 3 may be operated based on the digital key scheme using the above-described wireless communication.

Figure 2:
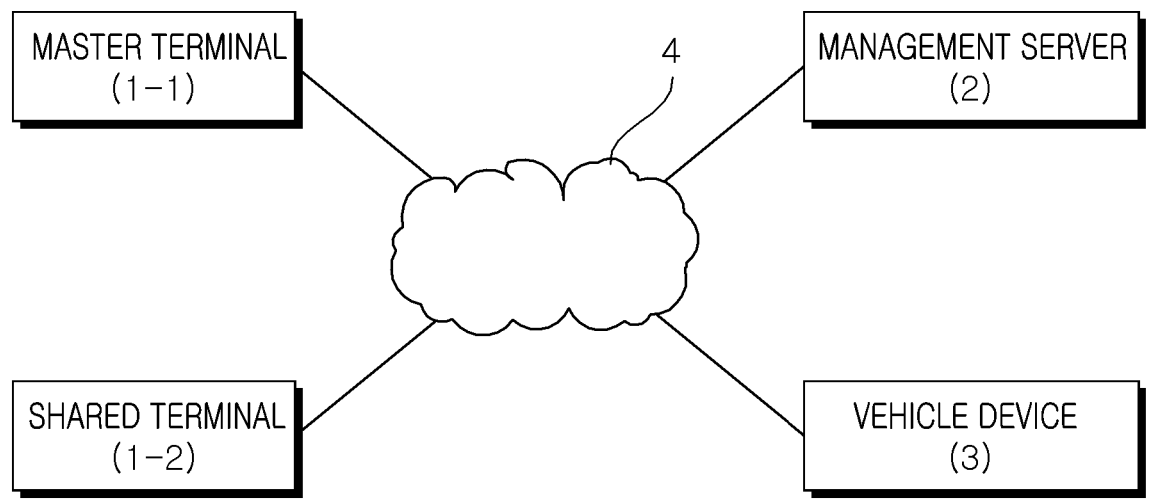
FIG. 2 is a diagram illustrating a configuration of a vehicle digital key sharing service system according to one embodiment of the present invention.

FIG. 2 is a diagram illustrating a configuration of a vehicle digital key sharing service system according to one embodiment of the present invention.

Referring to FIG. 2, the vehicle digital key sharing service system may include a master terminal 1-1, a shared terminal 1-2, a management server 2, and a vehicle device 3, which may be connected over a network 4.

The master terminal 1-1, which is a mobile terminal carried by a primary user who possesses a digital key, is authenticated by the management server 2 and issued with a primary digital key. The primary user becomes a vehicle owner. The shared terminal 1-2 is a mobile terminal carried by a shared user. The shared user is a user with whom the primary user has shared the digital key. For example, the shared user may be a family member, a friend, or the like.

The management server 2 is a device that manages the life cycle of a digital key of the user, such as registration, issuance, and disposal.

The master terminal 1-1 is operated in a normal OS (OS) and a secure OS, and when the master terminal 1-1 requests the management server 2 to register a digital key through a dedicated application, a digital key is registered as a terminal digital key is stored in a secure area separated from a normal area of the master terminal 1-1 using the dedicated application of the master terminal 1-1 after user authentication in the management server 2.

When the master terminal 1-1 approaches or tags a vehicle after the digital key is registered, an authentication token is generated using a terminal digital key stored in the secure area through the dedicated application of the master terminal 1-1 and then is transmitted to the vehicle device 3. The vehicle device 3 may validate the authentication token by operating a pre-stored vehicle digital key, and thereby unlock the door of the vehicle. When the master terminal 1-1 shares the digital key with the shared terminal 1-2, the master terminal 1-1 may restrict the use of the digital key by setting a restriction value. For example, the master terminal 1-1 may pre-set a usable period, the number of usable times, a usable area, re-sharable information, and the like and restrict a usage right of the shared terminal 1-2.

The shared terminal 1-2 is also operated in a normal OS and a secure OS, like the master terminal 1-1. The shared terminal 1-2 may share the digital key in which the restriction value is reflected through the master terminal 1-1 and unlock the door of the vehicle device 3 within a limited range using the shared digital key. As a method of sharing a digital key, the digital key may be forwarded via the management server 2 or be forwarded through direct access using a short-range wireless communication scheme.

Services available to the user using the digital key are not only door locking and door unlocking, but also services, such as emergency alarm, emergency alarm release, remote starting, remote start release, trunk open, and the like.

Figure 3:
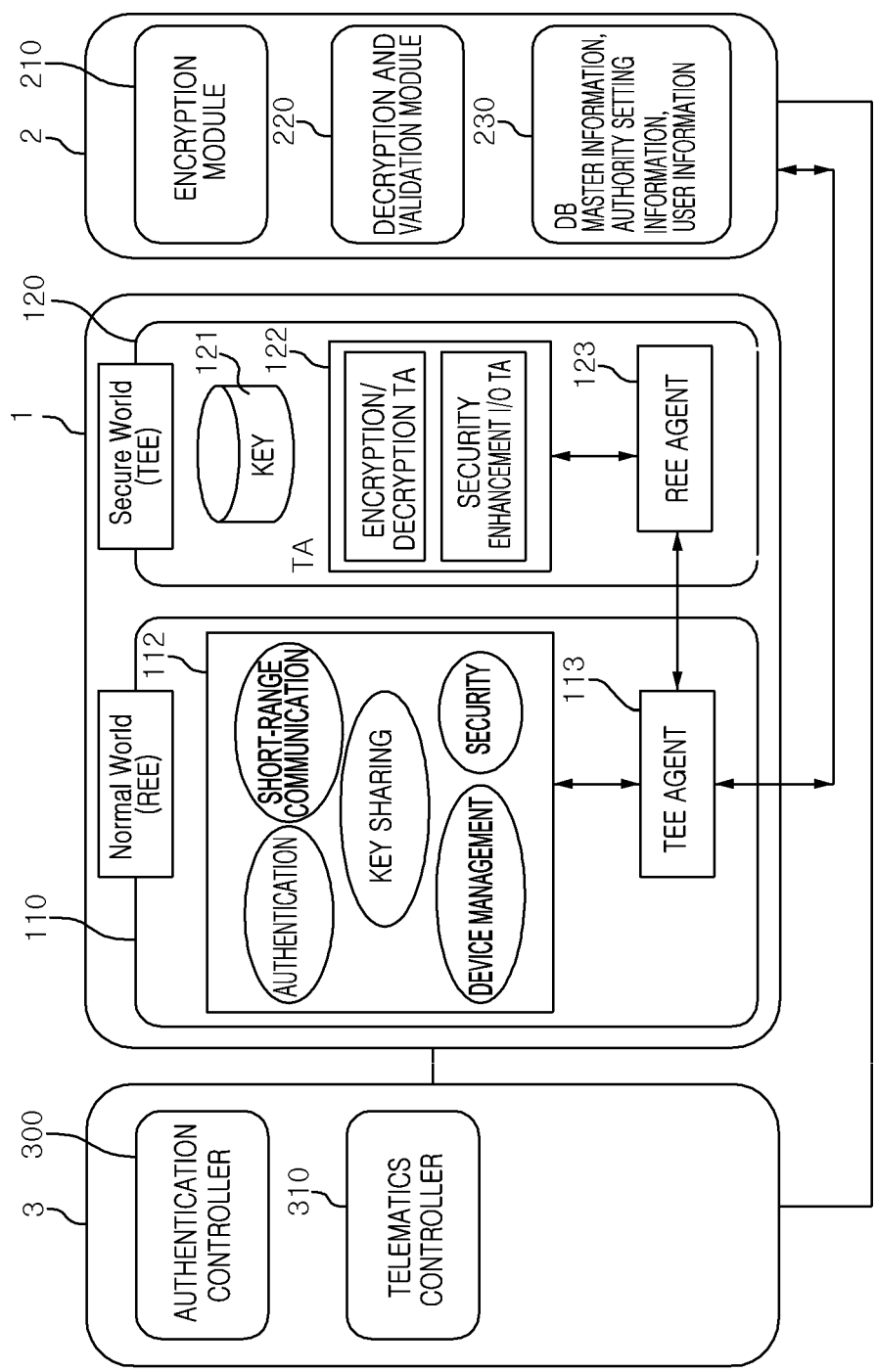
FIG. 3 is a block diagram illustrating a detailed configuration of a digital key sharing service system according to one embodiment of the present invention.

FIG. 3 is a block diagram illustrating a detailed configuration of a digital key sharing service system according to one embodiment of the present invention.

A mobile terminal 1 applied to one embodiment of the present disclosure is a portable terminal, such as a smartphone, a tablet personal computer (PC), and the like, and is equipped with a normal OS, such as Android (an OS of Google for smartphones) or iOS (an OS of Apple Inc. for iPhones), and a secure OS that runs independently of the normal OS. Hereinafter, an area in which the normal OS is operated will be referred to as a "normal world (NW)" 110 and an area in which the secure OS is operated will be referred to as a "secure world (SW)" 120. The SW 120 may correspond to a mobile secure world that uses one of trusted execution environment (TEE), white box cryptography (WBC), universal subscriber identity module (USIM), and embedded subscriber identity module (eSIM). Hereinafter, a description will be given of TEE for convenience of description, but it is apparent that the embodiment can be similarly applied to various security processing technologies, such as WBC, USIM, eSIM, and the like.

Security-related applications 112 that provides mobile security enhancement services, such as payment settlement, authentication, financial information management, personal information management, device management, security services, and the like, accesses security information located in the SW 120 through a TEE agent 113 when they provide a service requiring security. TEE agent 113 may enable communication with TEE in the NW 110 and serve as a gateway between the mobile security enhancement service applications. The TEE agent 113 may be loaded in the mobile security enhancement service application 112 in the form of an application programming interface (API) or may operate in the background in the form of a standalone application.

The TEE agent 113 communicates with a rich execution environment (REE) agent 123 residing in the SW 120. The REE agent 123 may enable communication with REE in the SW 120 and serve as a gateway for a trusted application (hereinafter referred to as a "TA") 122. The REE agent 123 only accepts access of an authenticated TEE agent 113.

The TA 122 performs operations for managing and controlling personal information stored in the SW 120, such as provision of a security-enhanced user interface (security enhanced input/output (I/O) TA) through an I/O device, such as a camera, a microphone, screen touch, a fingerprint scanner, and the like, encryption and decryption (encryption decryption TA) of a feature value for specifying a user, and storage of the encrypted feature value in a personal information database (DB) 121, and the like. The TA 122 is not directly accessible in the NW 110 and is only accessible via the REE agent 123. In addition, key personal information, such as feature values, a digital certificate, an identity (ID), and a password (PW), which are necessary for operations of the TA 122, such as site registration check, user private key encryption, generation of an authentication token, decryption of an authentication token, generation of digital signature data, check of digital signature data, and the like, are also stored in the SW 120. According to an embodiment, the personal information DB 121 may be configured to be located in the SW that is physically separated from the NW in which the normal OS is operated. Alternatively, the entire SW 120 may be stored in a secure area.

According to one embodiment of the present invention, at the time of performing authentication, the TEE agent 113 may be managed or controlled by the management server 2 external to the mobile terminal 1. The management server 2 includes an encryption module 210, a decryption and validation module 220, and a DB 230 in which digital key information, restriction value information, and user information are stored, so that the management server 2 performs user authentication along with the TEE agent 113 of the mobile terminal 1. The encryption module 210 encrypts the digital key and the restriction value, as well as the generated authentication token. The decryption and validation module 220 decrypts the authentication token for a login service and the digital key and restriction value, which are encrypted and forwarded, and verifies whether a corresponding user is valid by decrypting digital signature data for a digital signature service.

The vehicle device 3 may have a vehicle door and the vehicle door may be unlocked by the digital key of the mobile terminal 1. The vehicle device 3 according to one embodiment may include an authentication controller 300 and further include a telematics controller 310.

As the mobile terminal 1 approaches the vehicle device 3, the authentication controller 300 recognizes the mobile terminal 1, receives a public key for encryption from the recognized mobile terminal 1, and then encrypts vehicle information using the received public key. Then, when receiving an encrypted vehicle digital key, the authentication controller 300 decrypts and stores the vehicle digital key. The authentication controller 300 may be in the form of a mountable wireless charging pad which receives a wireless power signal from the mobile terminal 1 and charges the power.

The telematics controller 310 is directly connected to the management server 2 over a network, transmits the encrypted vehicle information to the management server 2, and receives the encrypted vehicle digital key from the management server 2. Telematics refers to a vehicle wireless Internet service that combines vehicle and wireless communication.

Figure 4:
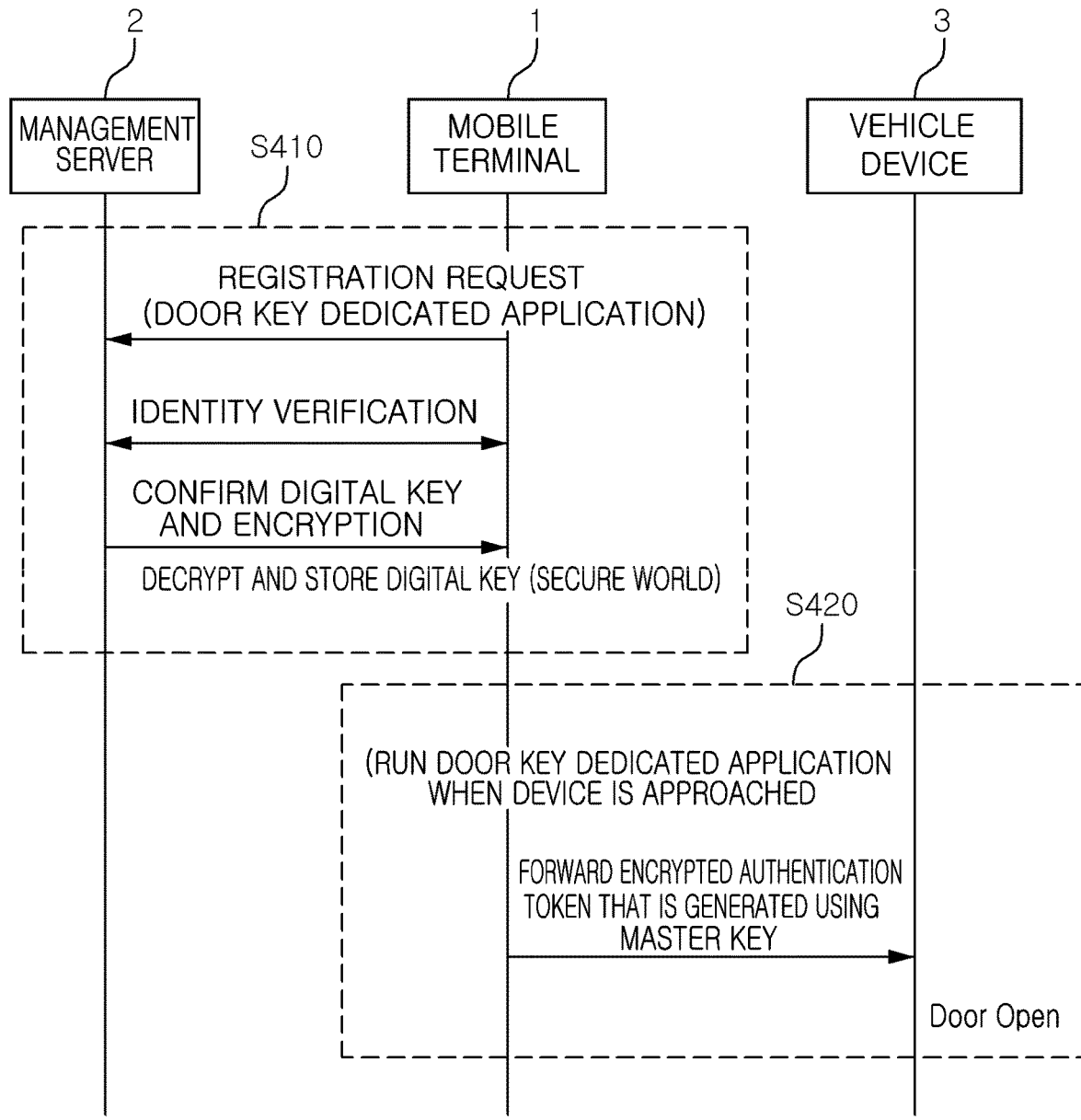
FIG. 4 is a diagram schematically illustrating a vehicle digital key sharing service method according to one embodiment of the present invention.

FIG. 4 is a diagram schematically illustrating a vehicle digital key sharing service method according to one embodiment of the present invention.

Referring to FIG. 4, the vehicle digital key sharing service method according to one embodiment of the present invention includes operations of registering a digital key (S410) and using the digital key (S420).

More specifically, in operation S410 of registering a digital key, a vehicle digital key is stored in a SW separated from a NW of a mobile terminal 1 using a dedicated application of the mobile terminal 1 after user authentication in a management server 2 when the mobile terminal 1 requests the management server 2 to register the digital key of a vehicle device 3 through the dedicated application. A user authentication method may include a short message service (SMS), non-face-to-face authentication, a digital certificate, Internet personal identification number (i-PIN), and the like.

In operation S420 of using a vehicle device digital key, when the mobile terminal 1 approaches a vehicle, an authentication token is generated through the dedicated application of the mobile terminal 1 by using a terminal digital key stored in the SW and the authentication token is forwarded to the vehicle device 3. Then, the vehicle device 3 activates a pre-stored vehicle digital key to validate the authentication token so that a door of the vehicle is unlocked.

A chip for encryption/decryption equipped with a security module may be attached to the vehicle device 3, and the vehicle device 3 applied to the embodiment of the present invention may include a security module and implement encryption and decryption using the chip to which a small-sized central processing unit (CPU) and a memory are attached.

As public key encryption methods applied to operation S410 of registering the digital key, RSA 1024 and 2048 are used, but the embodiment is not limited thereto. Also, as symmetric key encryption methods used in operation S420 of using the vehicle device digital key and in a shared terminal which will be described below, AES128 and 256 and SEED256 are used, but it is preferable that the embodiment is not limited thereto.

In addition, in the embodiment of the present invention, the authentication token may be implemented in a master terminal, a shared terminal which will be described below, and the door of the vehicle device by applying a count increment scheme out of a method of using time information and a method of incrementing a count.

Hereinafter, the operation of registering the digital key illustrated in FIG. 4 will be described in detail with reference to FIGS. 5 and 6.

Figure 5:
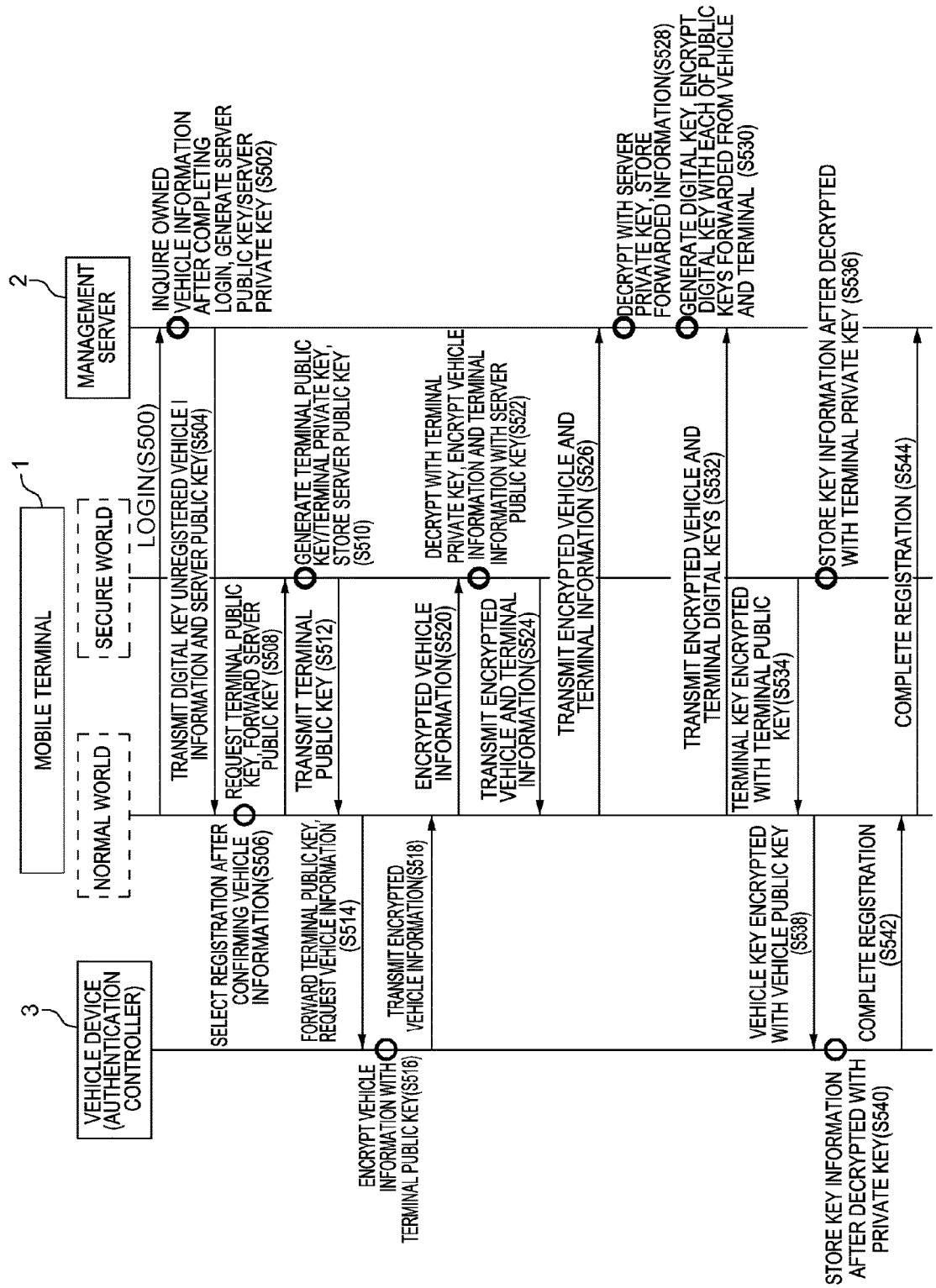
FIG. 5 is a flowchart for describing in detail a method of registering a digital key in a mobile terminal-based relay mode according to one embodiment of the present invention.

FIG. 5 is a flowchart for describing in detail a method of registering a digital key in a mobile terminal-based relay mode according to one embodiment of the present invention.

In the mobile terminal-based relay mode, the vehicle device 3 does not support a telematics function, and thus the mobile terminal 1 serves as a gateway G/W of the vehicle device 3 and the management server 2. In this case, the mobile terminal 1 relays the vehicle device 3 and process vehicle digital key registration through authentication by the management server 2.

Referring to FIG. 5, the mobile terminal 1 runs the dedicated application and logs in to the management server 2 (S500). In this case, ID/PW, an email address, and the like may be input for logging in (S500). After completing login, the management server 2 inquires owned vehicle information (S502). At this time, when there is no owned vehicle information, a process of confirming beneficial ownership of the vehicle may be added. For example, email authentication, transmission of a photograph of a vehicle registration, and the like may be required. Then, the management server 2 generates a server public key and a server private key (S502) and transmits digital key unregistered vehicle information and the server public key to the mobile terminal 1 (S504).

The mobile terminal 1 selects registration after confirming the vehicle information through the NW (S506). Then, the mobile terminal 1 forwards a server public key to the SW of the mobile terminal 1 while requesting a terminal public key (S508). The SW of the mobile terminal 1 generates a terminal asymmetric key and stores the server public key therein (S510). At this time, a secure OS of the mobile terminal 1 may generate the terminal asymmetric key formed of a pair of a private key and a public key using a device ID of the mobile terminal 1. Thereafter, the mobile terminal 1 transmits the terminal public key from the SW to the NW (S512) and the mobile terminal 1 requests the vehicle information wile forwarding the terminal public key to the vehicle device 3 from the NW (S514).

The vehicle device 3 encrypts the vehicle information with the terminal public key received from the mobile terminal 1 (S516). The vehicle information includes a vehicle identification number (VIN), authentication controller information, a vehicle public key, and the like. The vehicle device 3 transmits the encrypted vehicle information to the mobile terminal 1 (S518) and the mobile terminal 1 moves the encrypted vehicle information from the NW to the SW (S520). The mobile terminal 1 decrypts the vehicle information with the terminal private key in the SW (S520), then encrypts the vehicle information and terminal information with the server public key (S522), and transmits the encrypted vehicle information and terminal information to the NW (S524).

The mobile terminal 1 transmits the encrypted vehicle information terminal information from the NW to the management server 2 (S526) and the management server 2 decrypts the vehicle information and terminal information with the server private key and stores the decrypted information therein (S528). Thereafter, the management server 2 generates a digital key and encrypts the digital key with the public keys transmitted from each of the vehicle device and the mobile terminal 1 (S530). For example, the management server 2 generates an encrypted vehicle digital key by encrypting the digital key using the vehicle public key in the vehicle information and generates an encrypted terminal digital key by encrypting the digital key using the terminal public key in the terminal information. The management server 2 transmits the encrypted vehicle and terminal digital keys to the mobile terminal 1 (S532), the mobile terminal 1 forwards the terminal digital key encrypted with the terminal public key to the SW (S534), and the encrypted terminal digital key is decrypted using the terminal private key and then stored in the SW (S536).

Meanwhile, the mobile terminal 1 transmits the vehicle key encrypted with the vehicle public key to the vehicle device 3 (S538) and the vehicle device 3 decrypts a vehicle key with the vehicle private key, stores the decrypted vehicle key therein (S540), and transmits a registration complete message to the mobile terminal 1 (S542). Then, the mobile terminal 1 transmits the registration complete message to the management server 2 (S544).

Figure 6:
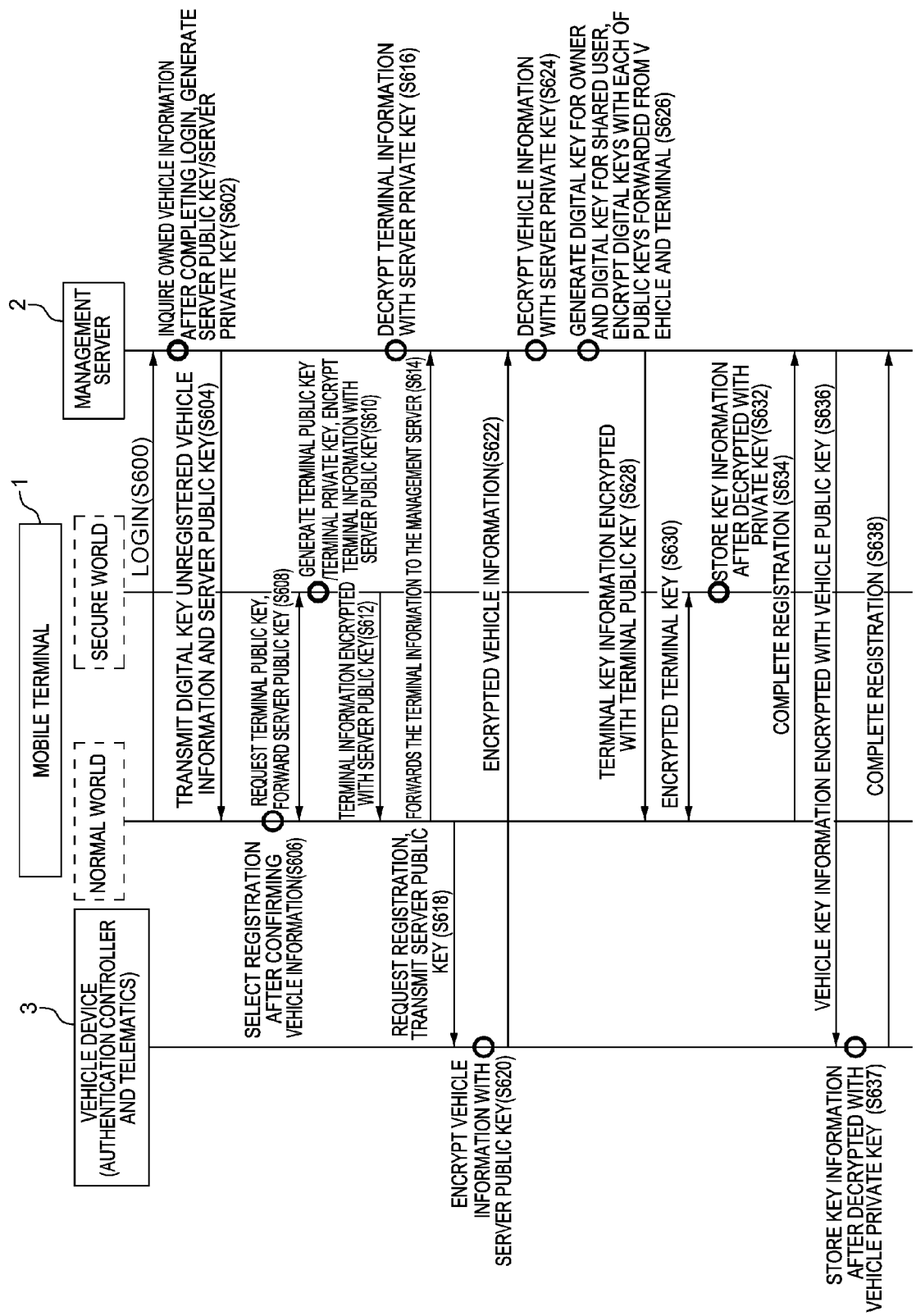
FIG. 6 is a flowchart for describing in detail a method of registering a digital key in a vehicle device-based telematics support mode according to one embodiment of the present invention.

FIG. 6 is a flowchart for describing in detail a method of registering a digital key in a vehicle device-based telematics support mode according to one embodiment of the present invention.

In the vehicle device-based telematics support mode, the vehicle device 1 may directly access the management server 2 and process registration of a digital key through authentication by the management server 2.

Referring to FIG. 6, the mobile terminal 1 runs a dedicated application to log in to the management server 2 (S600). In this case, ID/PW, an email address, and the like may be input for logging in. The management server 2 inquires owned vehicle information (S602). At this time, when there is no owned vehicle information, a process of confirming beneficial ownership of the vehicle may be added. For example, email authentication, transmission of a photograph of a vehicle registration, and the like may be required. Then, the management server 2 generates a server public key and a server private key (S602) and transmits digital key unregistered vehicle information and the server public key to the mobile terminal 1 (S604).

The mobile terminal 1 confirms the vehicle information through the NW and selects registration (S606). In addition, the mobile terminal 1 forwards a server public key to the SW of the mobile terminal 1 while requesting a terminal public key (S608). The SW of the mobile terminal 1 generates a terminal asymmetric key and encrypts terminal information with the server public key (S610). At this time, a secure OS of the mobile terminal 1 may generate a terminal asymmetric key formed of a pair of a private key and a public key using a device ID of the mobile terminal 1. The terminal information includes the terminal public key. Subsequently, the mobile terminal 1 transmits the terminal information encrypted with the server public key from the SW to the NW (S612) and forwards the terminal information to the management server 2. The management server 2 decrypts the terminal information with a server private key (S616).

Meanwhile, the mobile terminal 1 transmits the server public key to the vehicle device 3 while requesting registration (S618) and the vehicle device 3 encrypts the vehicle information with the server public key (S620). The vehicle information may include (VIN), authentication controller information, a vehicle public key, and the like. The vehicle device 3 transmits the encrypted vehicle information to the management server 2 (S622) and the management server 2 decrypts the vehicle information with the server private key (S624).

Then, the management server 2 generates a digital key and encrypts the digital key with the public keys forwarded from each of the vehicle device 3 and the mobile terminal 1 (S626). For example, the management server 2 generates an encrypted vehicle digital key by encrypting the digital key using the vehicle public key in the vehicle information and generates an encrypted terminal digital key by encrypting the digital key using the terminal public key in the terminal information. The management server 2 transmits the terminal digital key encrypted with the terminal public key to the mobile terminal 1 (S628). The mobile terminal 1 forwards the terminal digital key encrypted with the terminal public key to the SW (S630), decrypts the terminal digital key with the terminal private key and stores the decrypted terminal digital key in the SW (S632), and then forwards a registration complete message to the management server (S634).

Thereafter, the management server 2 transmits a vehicle key encrypted with the vehicle public key to the vehicle device 3 (S636). The vehicle device 3 decrypts the vehicle key with the vehicle private key and stores the vehicle key therein (S636) and transmits a registration complete message to the management server 2 (S638).

Figure 7:
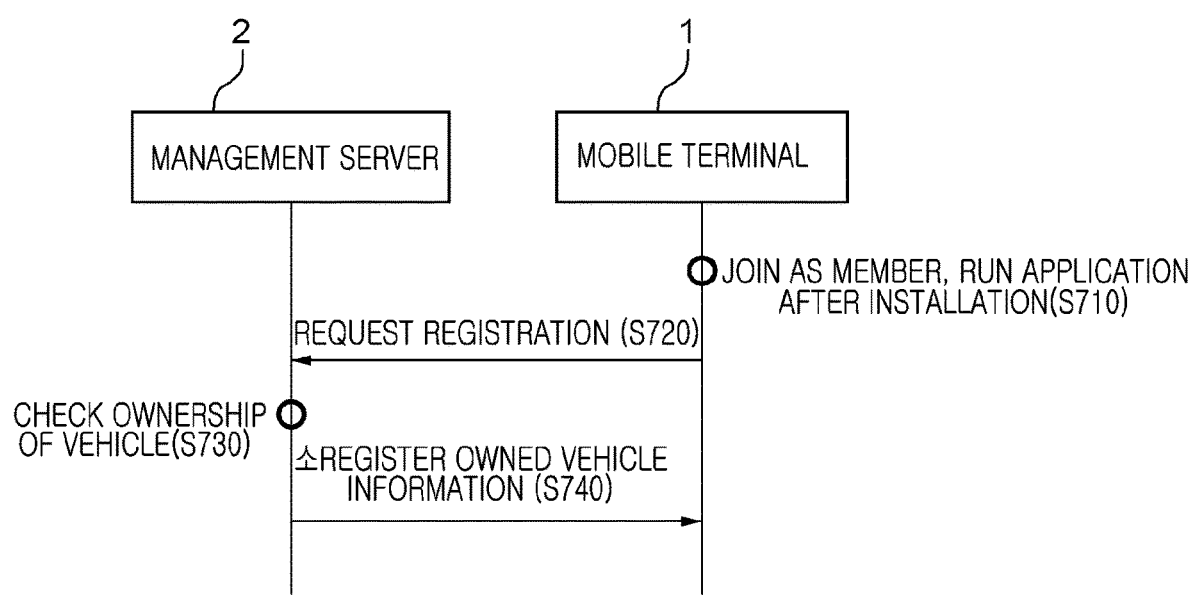
FIG. 7 is a flowchart for describing a method of authenticating a user when user's owned vehicle information is not present in a management server according to one embodiment of the present invention.

FIG. 7 is a flowchart for describing a method of authenticating a user when user's owned vehicle information is not present in a management server according to one embodiment of the present invention.

Referring to FIG. 7, a mobile terminal 1 joins as a member and installs and executes a dedicated application (S710). Then, the mobile terminal 1 accesses a management server 2 to request registration (S720). In this case, the management server 2 inquires owned vehicle information (S730) and when the user's owned vehicle information is not present in the management server 2, the management server 2 requests the mobile terminal 1 to register owned vehicle information and the mobile terminal 1 processes registration (S740). For example, user authentication of the mobile terminal 1 is performed by registering owned vehicle information through an email, transmission of a photograph of a vehicle registration, input of a VIN, or the like.

Figure 8:
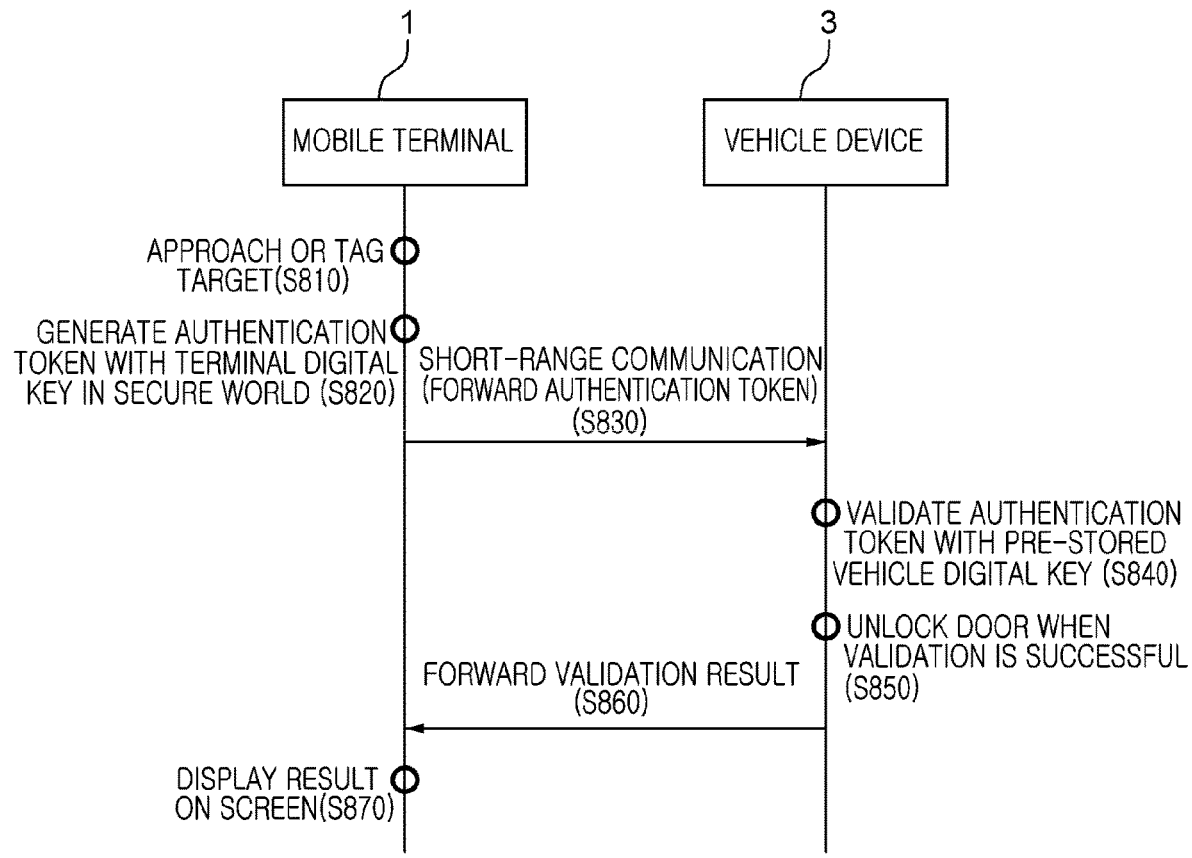
FIG. 8 is a flowchart for describing a method of unlocking a vehicle door using a digital key according to one embodiment of the present invention.

FIG. 8 is a flowchart for describing a method of unlocking a vehicle door using a digital key according to one embodiment of the present invention.

Referring to FIG. 8, in an embodiment of the present invention, the method of unlocking a vehicle door may include operations of generating an authentication token (S820), forwarding the authentication token (S830), validating the authentication token (S840), unlocking a door upon successful validation (S850), and displaying a mobile terminal screen (S870).

More specifically, in operation S820 of generating an authentication token, when a mobile terminal 1 approaches or tags a vehicle device 3 (S810), a dedicated application of the mobile terminal 1 is executed so that an authentication token is generated using a digital key stored in a SW.

In operation S830 of forwarding the authentication token, an encrypted authentication token generated in a secure OS through a shared application of the mobile terminal 1 may be forwarded to the vehicle device 3 in a wireless communication manner. In addition, in operation S840 of validating the authentication token, the authentication token forwarded from the mobile terminal 1 may be validated using a vehicle digital key stored in the vehicle device 3. In operation S850 of unlocking a door, when the validation of the authentication token in the vehicle device 3 is successful, a door of the vehicle device 3 may be unlocked. In addition, in operation S870 of displaying a user terminal screen, the vehicle device 3 may forward the validation result to the mobile terminal 1 (S860) and the mobile terminal 1 may display the validation result to a screen (S870).

Figure 9:
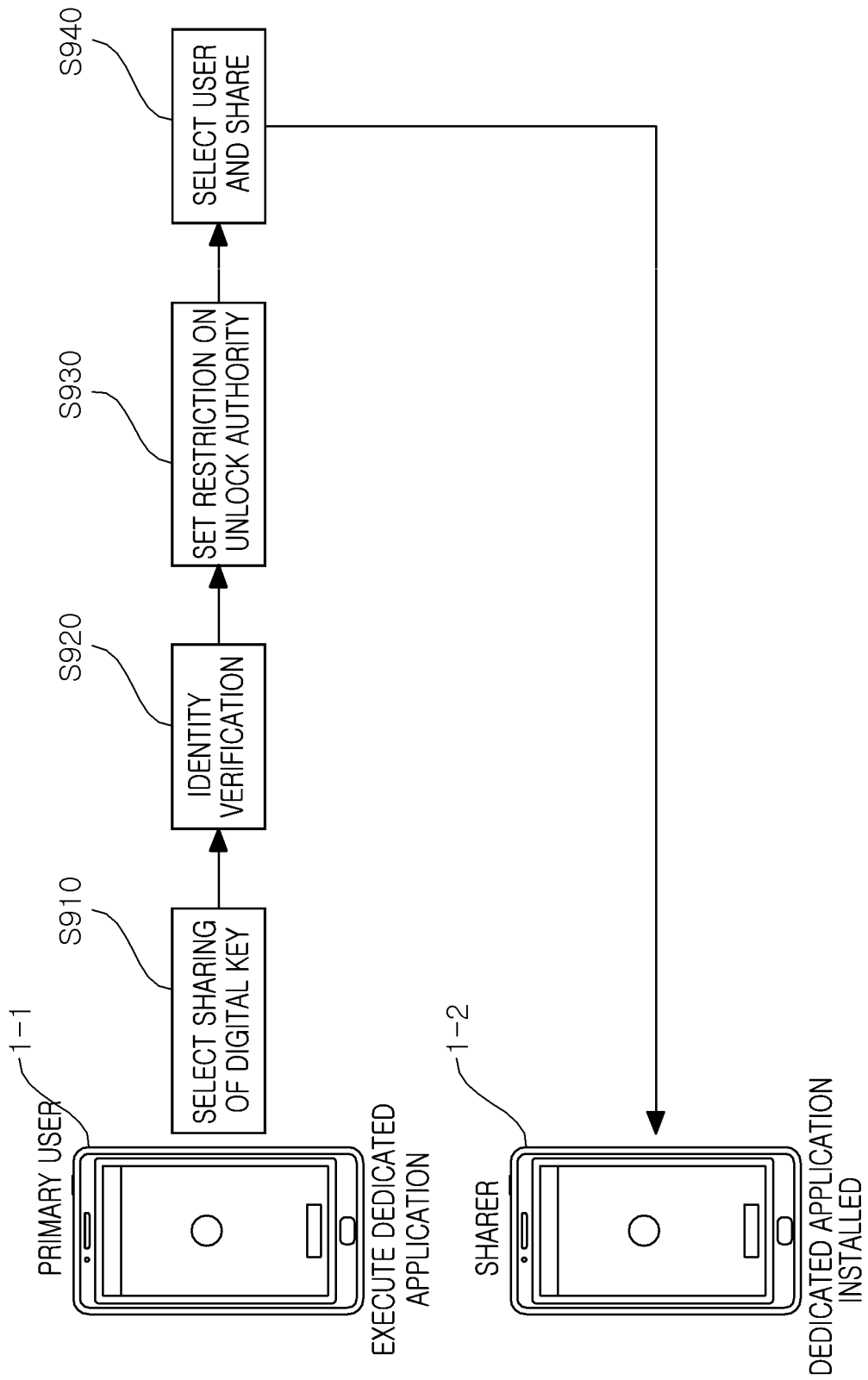
FIG. 9 is a flowchart for schematically describing an operation of sharing a digital key according to one embodiment of the present invention.

FIG. 9 is a flowchart for schematically describing an operation of sharing a digital key according to one embodiment of the present invention.

Referring to FIGS. 2 and 9, the master terminal 1-1 used by an owner of the primary digital key enters into a digital key sharing mode by receiving an input selection of a menu for sharing a digital key through a dedicated application (S910) or the like. When entering into the digital key sharing mode, the master terminal 1-1 performs identity verification using a pre-registered identity verification means (S920). In operation S920, an identity verification method may include a pattern, PIN, PW, biometric information (fingerprint, signature, iris, veins, voice, face, etc.), but is not limited thereto.

Then, the master terminal 1-1 generates a restriction value for unlock authority for the vehicle device 3 (S930). The restriction value may include a usable period, the number of usable times, a usable area, re-sharable information, and the like. Then, the master terminal 1-1 selects a shared terminal 1-2 used by a sharer and shares a digital key to which the restriction value is applied (S940). A digital key sharing method includes a face-to-face sharing method and a non-face-to-face method. The face-to-face sharing method includes near field communication (NFC), person-to-person (P2P), Bluetooth pairing, and the like. The non-face-to-face sharing method includes SMS transmission, PUSH request, telecommunications between shared applications, but is not limited thereto.

The digital key sharing method according to one embodiment may include a method of sharing a digital key by interlocking with the management server 2 or a method of directly forwarding a digital key from the master terminal 1-1 to the shared terminal 1-2, which will be described below with reference to FIGS. 10 and 11.

Figure 10:
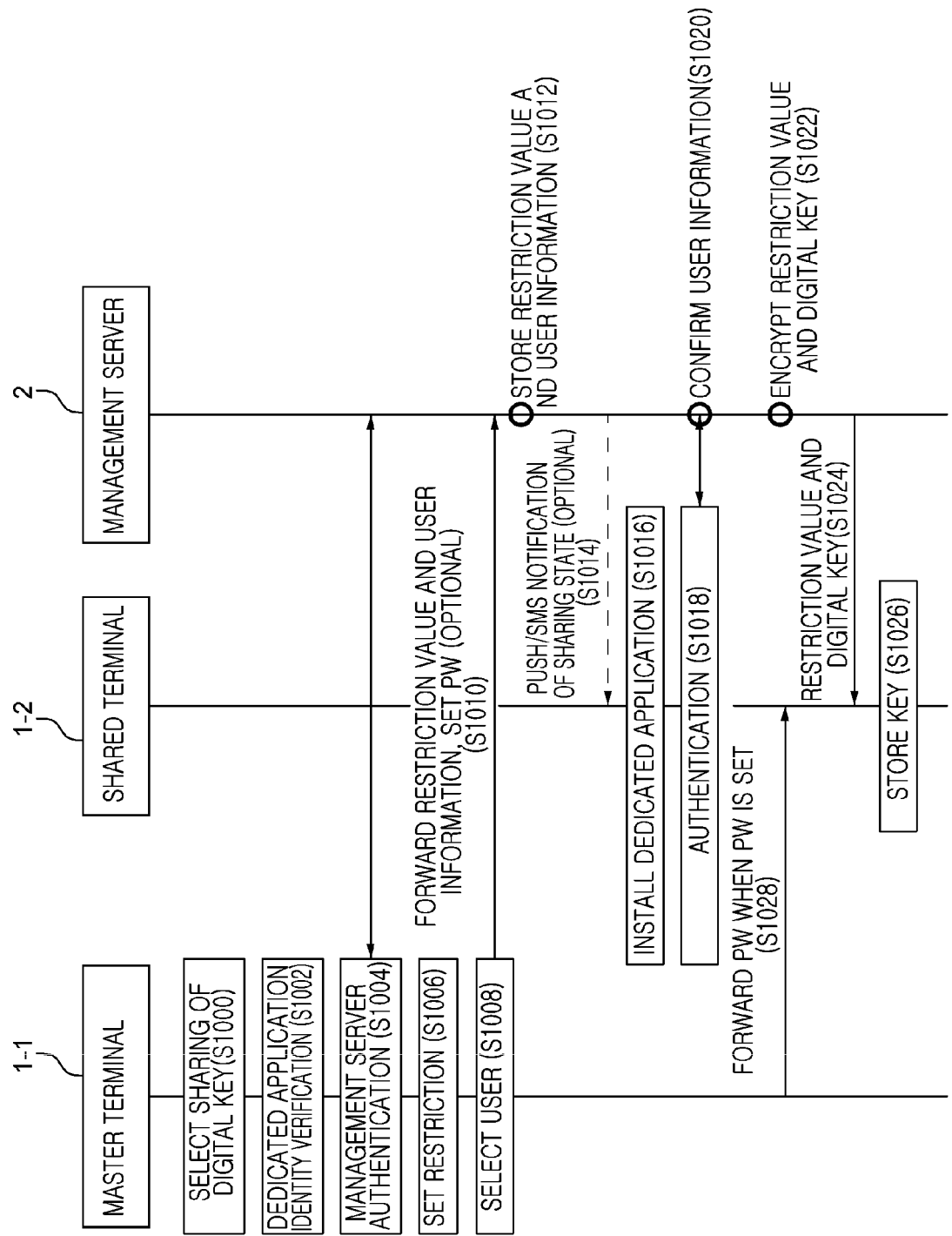
FIG. 10 is a flowchart for describing a first embodiment of the operation of sharing a digital key illustrated in FIG. 9.

FIG. 10 is a flowchart for describing a first embodiment of the operation of sharing a digital key illustrated in FIG. 9.

As shown in the drawings, in the operation of sharing a digital key according to the present invention, a digital key may be shared in cooperation with the management server 2 as in the first embodiment.

First, the user selects a digital key sharing menu through a dedicated application of the master terminal 1-1 (S1000). Then, a primary authentication process for a door key sharing service is performed using an identity verification means that is pre-stored in a SW through the dedicated application of the master terminal 1-1 (S1002). For example, authentication may be carried out using PIN, PW, pattern, biometric information, and the like. Then, a secondary authentication process for a door key sharing service is performed using a compound authentication method in which, the master terminal 1-1 goes through authentication via one or more identity verification means among ID/PW, a digital certificate, SMS, non-face-to-face authentication, and i-PIN in the management server 2 through the dedicated application (S1004).

Then, the master terminal 1-1 generates a restriction value for a terminal digital key stored in the SW (S1006). Thereafter, the master terminal 1-1 selects the shared terminal 1-2 to share the digital key (S1008) and forwards the restriction value for the digital key and information on the shared terminal 1-2 to the management server (S1010). The shared terminal information may include sharer information, such as a phone number, and PW may be set as an option. The management server 2 may store the restriction value for the digital value and the information on the shared terminal 1-2 therein (S1012) and transmit a digital key sharing message to the shared terminal 1-2 (S1014). For example, a sharing status may be informed through PUSH, SMS, and the like.

Subsequently, the shared terminal 1-2 installs a dedicated application (S1016) and then the shared terminal 1-2 is validated (S1018) by performing an authentication process in which user information for the shared terminal 1-2 is confirmed through the management server 2 (S1020). Once the management server 2 has completed validation of the shared terminal 1-2, the management server 2 encrypts the restriction value and the digital key (S1022) and transmits the encrypted restriction value and digital key to the shared terminal 1-2 (S1024). The shared terminal 1-2 decrypts the digital key and restriction value and stores them in a SW (S1026).

Here, in the process of encrypting and decrypting the digital key and restriction value forwarded to the shared terminal 1-2, it may be preferable that the encryption/decryption process using a public key/private key of the shared terminal 1-2 is performed in a state in which the authentication of the shared terminal 1-2 is complete. It may be noted that data transmitted through all communication intervals between the master terminal 1-1 and the shared terminal 1-2 is encrypted and decrypted only in the SW.

Meanwhile, operation S1010 in which the master terminal 1-1 sets a password for the digital key for the sake of security enhancement and operation S1028 in which, in the event of setting the password, the master terminal 1-1 forwards the password to the shared terminal 1-2 using a separate method may be optionally included. The separate method may include SMS, direct transfer method, and the like. That is, the master terminal 1-1 forwards the password directly to the shared terminal 1-2 through SMS text via mobile communication, a short-range wireless communication, or the like, rather than forwarding the password to the management server 2, so that the password can be prevented from being hacked during data communication with the management server 2.

Figure 11:
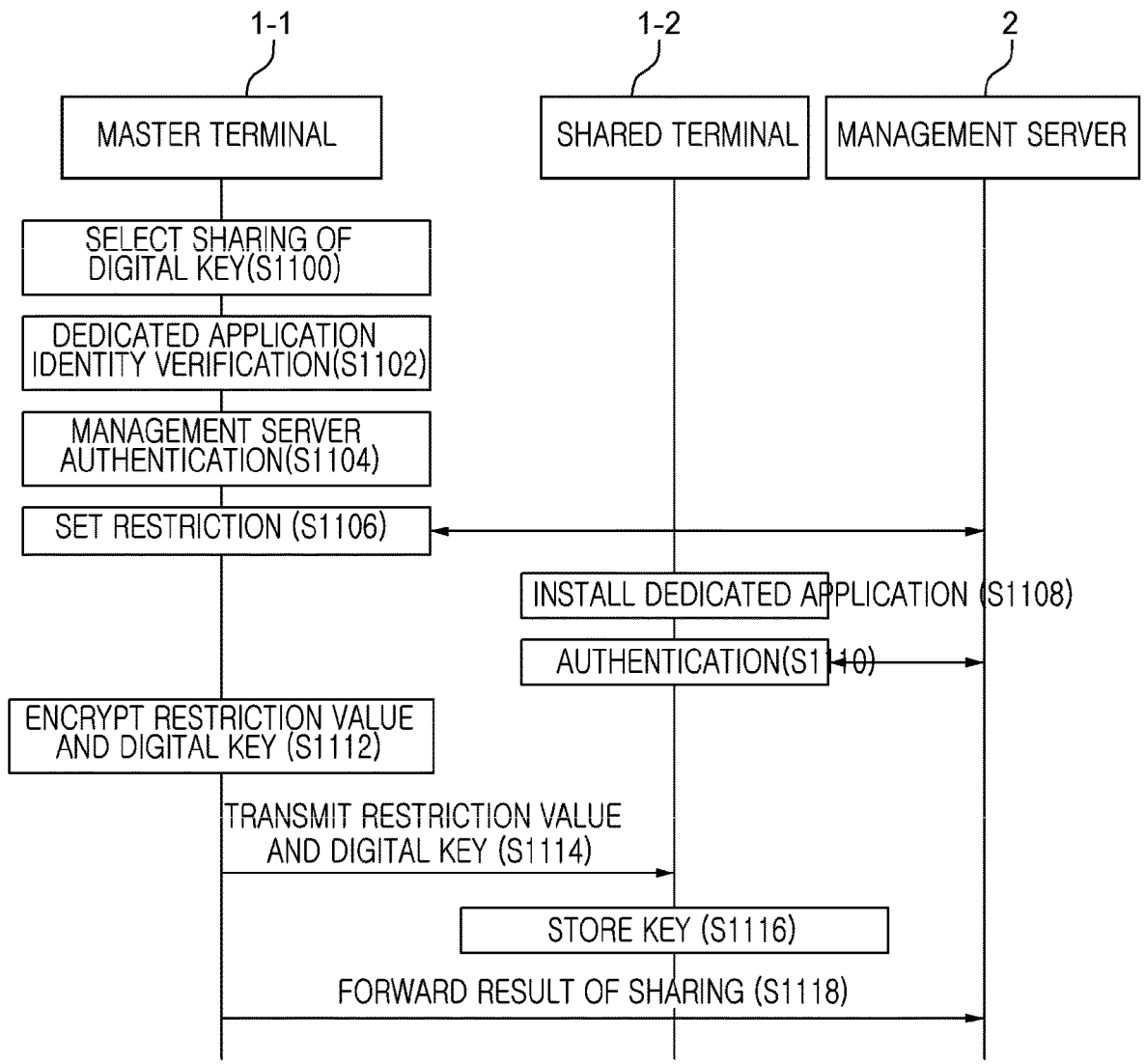
FIG. 11 is a flowchart for describing a second embodiment of the operation of sharing a digital key illustrated in FIG. 9.

FIG. 11 is a flowchart for describing a second embodiment of the operation of sharing a digital key illustrated in FIG. 9.

Referring to FIG. 11, the user selects a digital key sharing menu through a dedicated application of the master terminal 1-1 (S1110). Then, a primary authentication process for a door key sharing service is performed using an identity verification means that is pre-stored in a SW through the dedicated application of the master terminal 1-1 (S1102). Thereafter, a secondary authentication process for a door key sharing service is performed using a compound authentication method in which authentication is performed via one or more identity verification means among ID/PW, a digital certificate, SMS, non-face-to-face authentication, and i-PIN in the management server 2 through the dedicated application of the master terminal 1-1 (S1104). Then, the master terminal 1-1 generates a restriction value for a terminal digital key stored in the SW (S1106).

Then, the shared terminal 1-2 installs a dedicated application (S1108) and the shared terminal 1-2 is validated by performing an authentication process for the shared terminal 1-2 through the management server 2 (S1110). Once the validation of the shared terminal 1-2 is complete, the master terminal encrypts the digital key and the restriction value in the SW (S1112), directly forwards the encrypted digital key and restriction value to the shared terminal 1-2 in a wireless manner (S1114), and stores the encrypted digital key and restriction value in the SW (S1116). The wireless direct forwarding method may include NFC, P2P, WiFi, and the like. This method assumes that a primary user and a sharer are in the same space. In the process of encrypting and decrypting the digital key and restriction value forwarded to the shared terminal 1-2, it may be preferable that the encryption/decryption process using a public key/private key of the shared terminal 1-2 is performed in a state in which the authentication of the shared terminal 1-2 is complete. It may be noted that data transmitted through all communication intervals between the master terminal 1-1 and the shared terminal 1-2 is encrypted and decrypted only in the SW.

Figure 12:
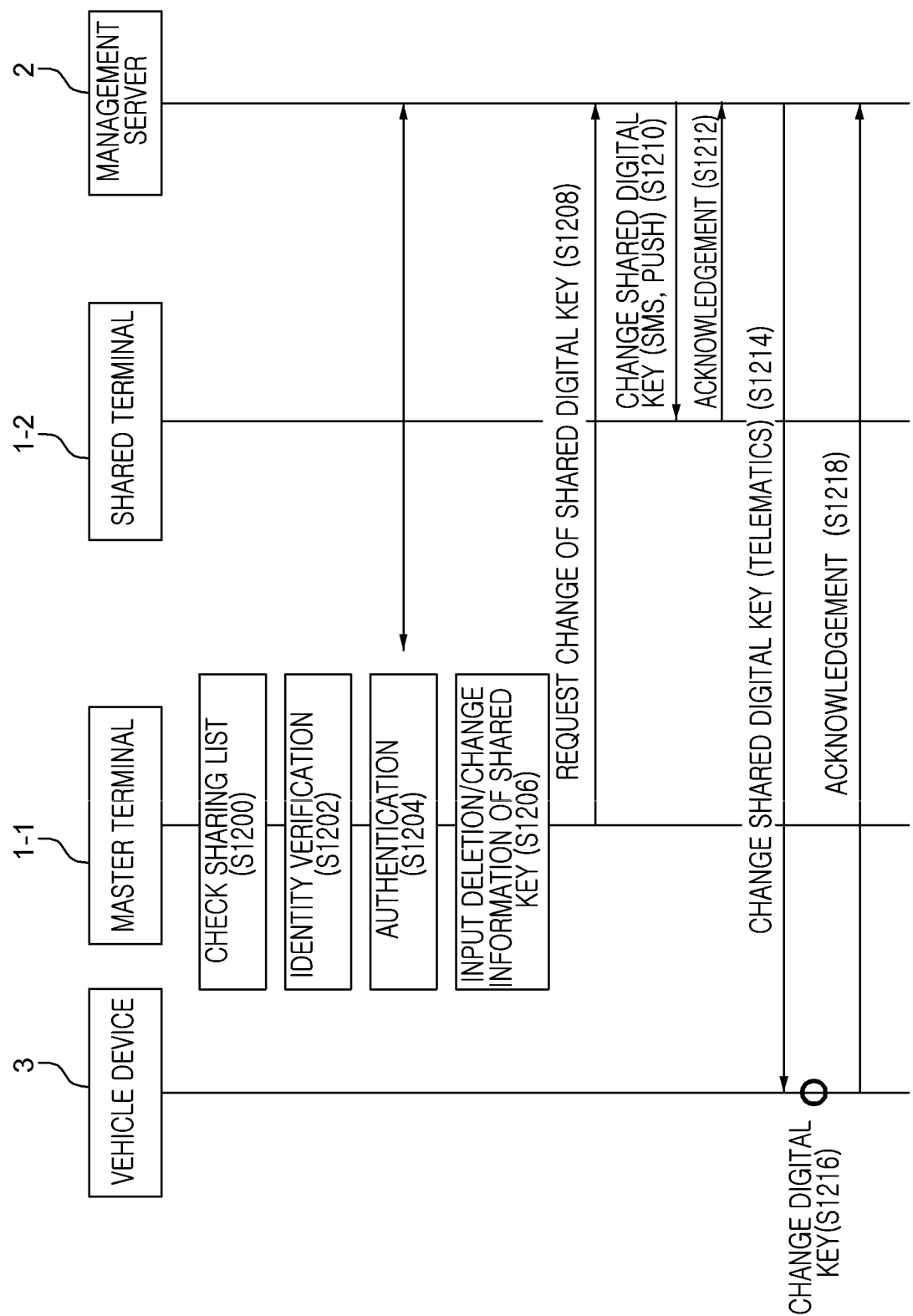
FIG. 12 is a flowchart illustrating a method of deleting or changing a shared key according to one embodiment of the present invention.

FIG. 12 is a flowchart illustrating a method of deleting or changing a shared key according to one embodiment of the present invention.

Referring to FIG. 12, a master terminal 1-1 may delete or change a digital key shared with a shared terminal 1-2 through a dedicated application. For example, the master terminal 1-1 checks a digital key sharing list through the dedicated application (S1200). When there is a digital key to be deleted or changed in the digital key sharing list, a primary authentication process for deleting or unsharing a shared door key is performed using an identity verification means stored in a SW through the dedicated application of the master terminal 1-1 (S1202). Then, a secondary authentication process for deleting or unsharing a shared door key is performed using a compound authentication method in which authentication is performed via an identity verification means in the management server 2 through the dedicated application of the master terminal 1-1 (S1204).

Then, the master terminal 1-1 receives a deletion or change request signal for a predetermined digital key in the sharing list (S1206) and requests the management server 2 to delete or change the corresponding digital key (S1208). The management server 2 changes or deletes a digital key of a shared terminal 1-2 which has shared the digital key requested to be deleted or changed (S1210) and provides a result to the shared terminal 1-2 (S1212).

When a vehicle device 3 supports telematics, the vehicle device 3 may change or delete the digital key in response to a request from the management server 2 to change or delete the digital key. When the vehicle device 3 does not support telematics, the owner of the master terminal 1-1 has to go to the vehicle and change a shared digital key using short-range communication.

Figure 13:
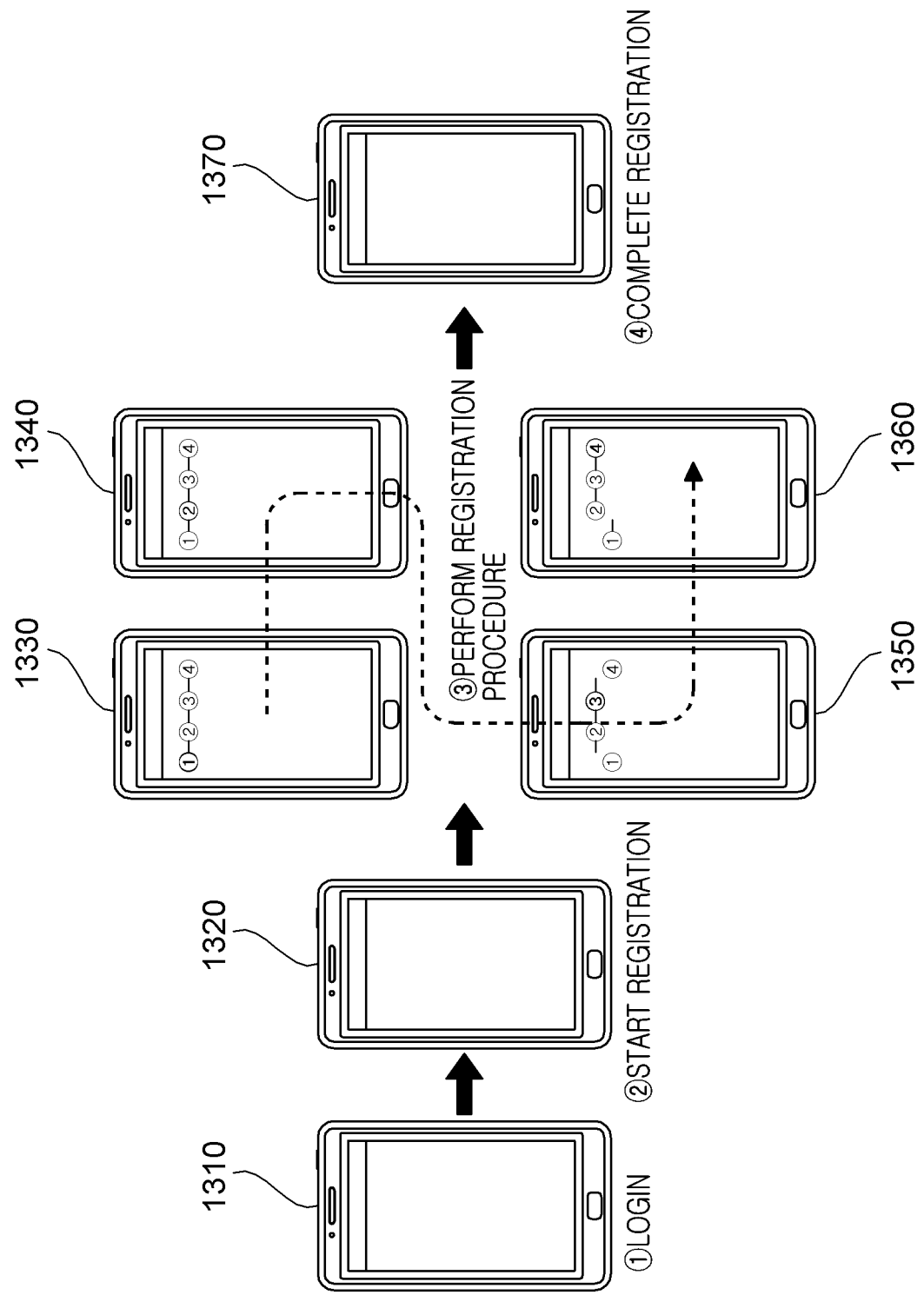
FIG. 13 is a diagram illustrating a mobile terminal screen displayed in accordance with a digital key registration procedure according to one embodiment of the present invention.

FIG. 13 is a diagram illustrating a mobile terminal screen displayed in accordance with a digital key registration procedure according to one embodiment of the present invention.

Referring to FIGS. 2 and 13, when the user executes the dedicated application of the master terminal 1-1, a login screen 1310 is displayed and the user accesses the management server 2 through login. In this case, in a registration start screen 1320 of the master terminal 1-1, inquired owned vehicle information is displayed and a new digital key registration procedure is guided. At the time of user's login, the management server 2 may inquire owned vehicle information, generate a server public key and private key, and transmit the server public key together with the inquired owned vehicle information to the master terminal 1-1. The server public key is stored in a SW of the master terminal 1-1.

Thereafter, when the user selects digital key registration, in a digital key registration screen 1330 of the master terminal 1-1 is displayed a guide screen to request the user to put the master terminal 1-1 on an authentication controller inside the vehicle for registration of the digital key. The authentication controller may be in the form of a cradle in which the master terminal 1-1 is mountable. The authentication controller may be a wireless charging pad which charges the master terminal 1-1 by sending a wireless power signal to the master terminal 1-1.

When the user puts the master terminal 1-1 on the authentication controller, the authentication controller displays a master terminal recognition screen 1340 and an ongoing registration screen 1350 in the master terminal 1-1. The digital key registration procedure includes an operation of the management server 2 to acquire encrypted vehicle public key and terminal public key, an operation of the management server 2 to generate a vehicle digital key using the vehicle public key and generate a terminal digital key using the terminal public key, and an operation of storing the terminal digital key in the master terminal 1-1 and storing the vehicle digital key in the vehicle device 3. When the registration of the digital key is complete, a registration complete screen 1360 is displayed. In this case, the user may designate a primary use vehicle that uses the registered digital key and the user may lock/unlock a door by tagging the master terminal to the vehicle door, without executing the dedicated application.

After the digital key registration, a service screen 1370 shows services available to the user using the registered digital key. For example, the services available to the user using the digital key may include door locking, door unlocking, emergency alarm, emergency alarm release, remote starting, remote start release, trunk open, and the like. In addition, a service for sharing a digital key with the shared terminal 1-2 is also available.

Figure 14:
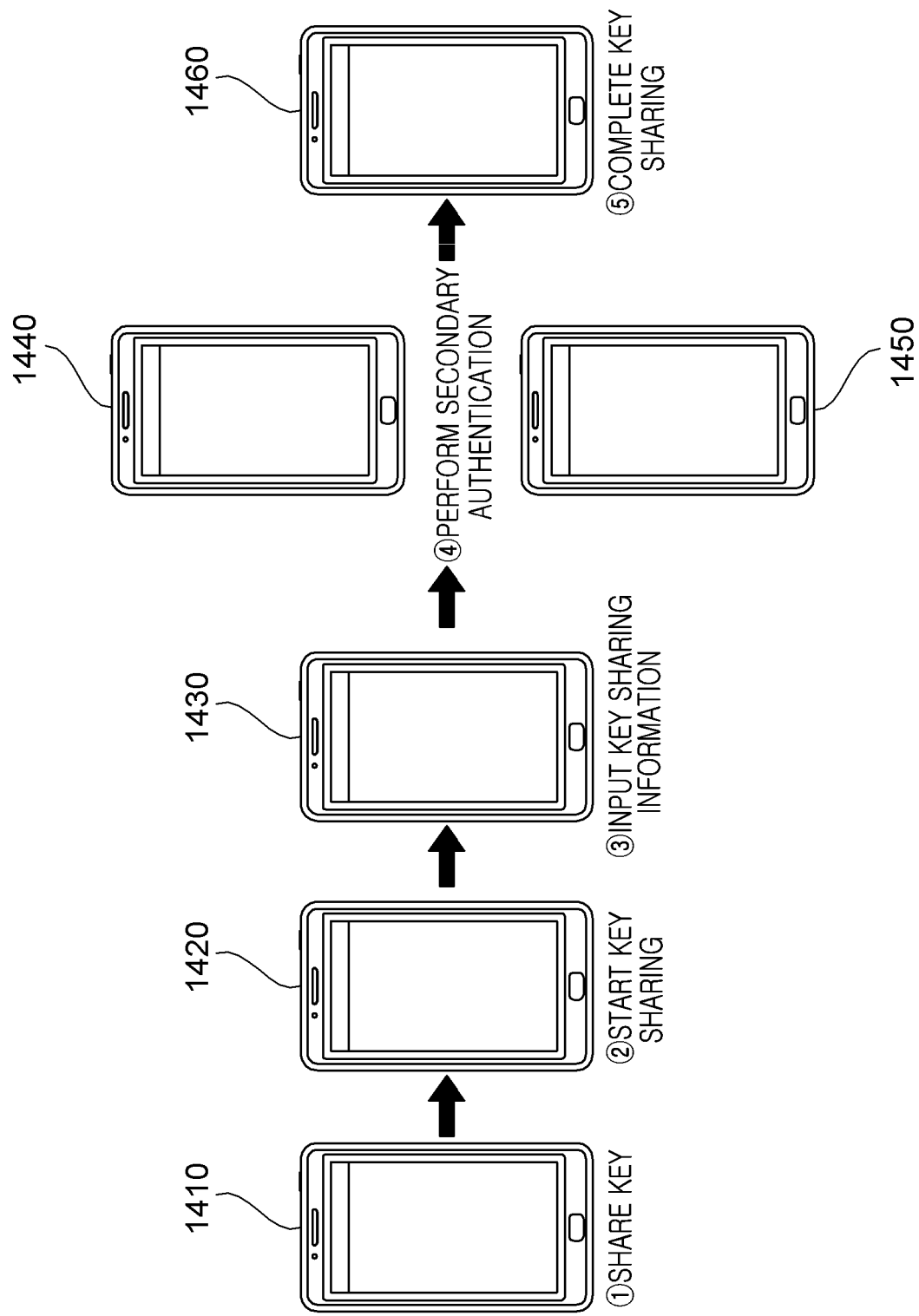
FIG. 14 is a diagram illustrating a mobile terminal screen displayed in accordance with a digital key sharing procedure according to one embodiment of the present invention.

FIG. 14 is a diagram illustrating a mobile terminal screen displayed in accordance with a digital key sharing procedure according to one embodiment of the present invention.

Referring to FIGS. 2 and 14, the user selects a digital key sharing menu in a service screen 1410. When the digital key menu is selected, a sharing restriction screen 1420 related to functions and period for key sharing is displayed. The user may input sharer information through the sharing restriction screen 1420 and create a sharing period, a sharing function, and the like. The sharing function may include digital key access, start-up, digital key remote control, smart remote parking, and the like.

Then, authentication screens 1430 and 1440 for performing the sharing function are displayed. In this case, a compound authentication method may be used. For example, a primary authentication process for a door key sharing service may be performed using an identity verification means stored in a SW through a dedicated application of the master terminal 1-1 and a secondary authentication process for the door key sharing service may be performed using the compound authentication method in which authentication is performed via an identity verification means in the management server 2 through the dedicated application of the master terminal 1-1. The authentication method may include SMS, PIN, fingerprints, and the like.

Once the key sharing is complete, information on a shared terminal sharing the digital key and a sharer is displayed in a sharing complete screen 1450. The user may perform control such as deletion of the sharer's digital key, suspension of permission for the sharer, and the like. Digital key information to be shared is transmitted to the sharer through short-range communication or a server.

The present invention as described with reference to FIGS. 1 to 14 is directed to providing a vehicle digital key sharing service method and system which can improve user convenience while securing security of a digital key by providing a master-slave digital key sharing service which allows a user-specific access right to be set using a mobile terminal operated in a normal OS and a secure OS.

In addition, the present invention has an effect in that security for a digital key capable of unlocking a door of a vehicle device that uses the digital key can be secured by decrypting and storing an encrypted digital key received from the management server in a secure OS using a mobile security environment-based mobile terminal.

Moreover, the present invention has an effect in that unlock authority can be restricted with various conditions through a sharing application that enables sharing of a digital key of the vehicle device and thereby the digital key can be safely shared with another user while user convenience is improved.

In addition, the present invention has an effect in that in case where the vehicle device supports telematics, the vehicle device can directly access the management server without relay of the mobile terminal and have a vehicle digital key registered.

Also, the present invention has an effect in that a compound authentication method is used in which authentication is performed via one or more identity verification means at the time of user authentication through the management server in the course of registering the digital key and a digital key which is encrypted using an asymmetric key algorithm and is received from the management server is decrypted in a secure OS of the mobile terminal so that security of a digital can be enhanced even when the digital key is forwarded and received online.

In addition, the present invention has an effect in that the authentication token encryption/decryption process is performed and thereby leakage of the digital key can be fundamentally prevented even when the door of the vehicle device is unlocked using a digital key stored in the secure world of the mobile terminal.

In addition, the present invention has an effect in that double authentication is performed when a digital key is shared with another user through a dedicated application and thereby the digital key is prevented from being shared against the user's will.

Further, the present invention has an effect in that the digital key can is forwarded in cooperation with the management server or is forwarded through direct connection with a shared terminal of another user when the digital key is shared with the other user so that the user convenience and utility can be increased.

Additionally, the present invention has an effect in that safety can be increased as the security authentication process for the shared terminal to share a digital key is performed through the management server.

In addition, the present invention has an effect in that security is enhanced by optionally adding an operation in which the master terminal transmits a specific code to a shared terminal when forwarding the digital key to another user in cooperation with the management server.

Also, the present invention has an effect in that even when a digital key stored in a shared terminal is used, an authentication token is generated in a secure OS using the digital key and goes through the encryption/decryption process together with a restriction value and thereby the security required when sharing the digital key can be secured.

Moreover, the present invention has an effect of simultaneously increasing security and encryption/decryption processing speed by implementing an encryption algorithm that passes through the encryption/decryption process using a symmetric key derived from the digital key.

Furthermore, the present invention has an effect in that a digital key is shared with another user by including a usable period, the number of usable times, a usable area, and the redistribution right so that the risk of theft of a vehicle device can be minimized even when the digital key is lost.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A vehicle digital key sharing service method comprising:
   a digital registration step in which a management server generates a terminal digital key and a vehicle digital key after user authentication in response to a digital key registration request through a dedicated application of a mobile terminal and the mobile terminal stores the terminal digital key in a secure world that is separated from a normal world;
   a digital key using step in which an authentication token is generated using the terminal digital key stored in the secure world when the mobile terminal approaches or tags a vehicle, and a vehicle device locks or unlocks a door of the vehicle by activating the vehicle digital key, which is registered from the management server, to validate the authentication token;
   a step in which a digital key sharing mode is activated via a dedicated application of a master terminal used by a primary user who owns a digital key, a restriction on unlock authority for the vehicle device is set by performing identification verification and authentication, and a digital key to which a restriction value is applied is shared with a shared terminal used by a sharer; and
   wherein the step of sharing the digital key comprises:
   receiving, by the master terminal, an input selection of a menu for sharing a digital key through the dedicated application;
   performing a primary authentication process for a door key sharing service with an identity verification means stored in the secure world through the dedicated application of the master terminal;
   performing a secondary authentication process for a door key sharing service using a compound authentication method in which authentication is performed via an identity verification means in the management server through the dedicated application of the master terminal;
   generating a restriction value for the digital key stored in a secure world of the master terminal;
   forwarding, by the master terminal, the digital key and the restriction value for the digital key to a shared terminal to share the digital key;
   storing, by the shared terminal, the digital key received from the master terminal; and
   forwarding, by the master terminal, a result of sharing to the management server.

2. The vehicle digital key sharing service method of claim 1, wherein the digital key registration step comprises a step of registering the digital key in a mobile terminal-based relay mode in which on behalf of the vehicle device the mobile terminal relays registration of the vehicle digital key through authentication by the management server and a step of registering the digital key in a vehicle device-based telematics support mode in which each of the vehicle device and the mobile terminal processes registration of their own digital keys through authentication by the management server.

3. The vehicle digital key sharing service method of claim 2, wherein the step of registering the digital key in a mobile terminal-based relay mode comprises: receiving and storing, by the mobile terminal accessing the management server through the dedicated application, a server public key from the management server and generating a terminal public key and a terminal private key; forwarding, by the mobile terminal, the terminal public key to the vehicle device and decrypting encrypted vehicle information using the terminal private key after receiving the vehicle information encrypted using the terminal public key from the vehicle device; encrypting, by the mobile terminal, the vehicle information and terminal information using the server public key and then transmitting the encrypted vehicle information and terminal information to the management server; decrypting, by the management server, the information received from the mobile terminal, encrypting the digital key using each of a vehicle public key included in the vehicle information and the terminal public key included in the terminal information, and transmitting the encrypted digital keys to the mobile terminal; receiving, by the mobile terminal, the encrypted vehicle digital key and the encrypted terminal digital key from the management server, transmitting the vehicle digital key to the vehicle device, decrypting the terminal digital key, and storing the decrypted terminal digital key in the secure world; and receiving, by the vehicle device, the vehicle digital key and decrypting and storing the vehicle digital key.

4. The vehicle digital key sharing service method of claim 2, wherein the step of registering the digital key in a vehicle device-based telematics support mode comprises: receiving and storing, by the mobile terminal accessing the management server through the dedicated application, a server public key from the management server and generating a terminal public key and a terminal private key; forwarding, by the mobile terminal, a server public key to the vehicle device; encrypting, by the vehicle device, vehicle information with the server public key and transmitting the encrypted vehicle information to the management server; encrypting, by the mobile terminal, terminal information with the server public key and transmitting the encrypted terminal information to the management server;
   decrypting, by the management server, the information received from the mobile terminal, encrypting the digital key using each of a vehicle public key included in the vehicle information and a terminal public key included in the terminal information, and then transmitting the vehicle digital key to the vehicle device and transmitting the terminal digital key to the mobile terminal; receiving, by the mobile terminal, the encrypted terminal digital key from the management server, decrypting the received terminal digital key, and storing the decrypted terminal digital key in the secure world; and receiving, by the vehicle device, the encrypted vehicle digital key from the management server and decrypting and storing the received vehicle digital key.

5. The vehicle digital key sharing service method of claim 1, wherein the secure world of the mobile terminal corresponds to a mobile secure area using one of a trusted execution environment (TEE), white box cryptography (WBC), universal subscriber identity module (USIM), and embedded subscriber identity module (eSIM).

6. The vehicle digital key sharing service method of claim 1, the step of sharing the digital key comprises: receiving, by the master terminal, an input selection of a menu for sharing a digital key through a dedicated application; performing a primary authentication process for a door key sharing service through the dedicated application of the master terminal by using an identity verification means stored in a secure world; performing a secondary authentication process for a door key sharing service using a compound authentication method in which authentication is performed via an identity verification means in the management server through the dedicated application of the master terminal;

setting the restriction value for the digital key stored in the secure world of the master terminal;

receiving a selected shared terminal to share the digital key and forwarding the restriction value for the digital key and information on the shared terminal to the management server; and storing, by the management server, the restriction value for the digital key and the information on the shared terminal and transmitting a digital key sharing message to the shared terminal.

7. The vehicle digital key sharing service method of claim 1, further comprising a step of deleting or changing a shared digital key through a dedicated application, wherein the step of deleting or changing the digital key comprises: checking, by a master terminal, a digital key sharing list through the dedicated application; performing a primary authentication process for a door key sharing service using an identity verification means stored in a secure world through the dedicated application of the master terminal; performing a secondary authentication process for a door key sharing service using a compound authentication method in which authentication is performed via an identity verification means in the management server through the dedicated application of the master terminal;

receiving, by the master terminal, a request signal for deleting or changing a predetermined digital key in the digital key sharing list and requesting the management server to delete or change the corresponding digital key; and changing or deleting, by the management server, a digital key of a shared terminal which has shared a digital key requested to be deleted or changed.

8. The vehicle digital key sharing service method of claim 7, further comprising, in case of the vehicle device supporting telematics, changing or deleting, by the vehicle device, the digital key in response to a request of the management server to change or delete the digital key.

9. A vehicle digital key sharing service system comprising:

a management server configured to manage registration, issuance, and disposal of a digital key for a digital key sharing service including locking and unlocking of a door of a vehicle device;

a mobile terminal configured to receive a terminal digital key issued through authentication by the authentication server, store the terminal digital key in a secure world, and share the digital key with a shared terminal by setting an authority restriction;

the vehicle device configured to receive a vehicle digital key issued through authentication by the management server and store the vehicle digital key therein;

wherein the mobile terminal includes a master terminal configured to set restriction on unlock authority for the vehicle device through identification verification and authentication in response to receiving an input selection of a menu for sharing a digital key through a dedicated application and share a digital key to which a restriction value is applied with a shared terminal and the shared terminal configured to share the digital key with the master terminal; and wherein: the master terminal forwards the digital key to the shared terminal via the management server or directly accesses the shared terminal to forward the digital key to the shared terminal in a short-range wireless communication manner when the digital key to which the restriction value is applied is shared with the shared terminal and the restriction value includes a usable period, the number of usable times, a usable area, and re-sharable information.

10. The vehicle digital key sharing service system of claim 9, wherein the vehicle device comprises an authentication controller configured to recognize the mobile terminal as the mobile terminal approaches the vehicle device, receive a public key for encryption from the recognized mobile terminal, encrypt vehicle information using the received public key and decrypt and store a received encrypted vehicle digital key and a telematics controller directly connected to the management server over a network and configured to transmit the encrypted vehicle information to the management server and receive an encrypted vehicle digital key from the management server.

11. The vehicle digital key sharing service system of claim 10, wherein the authentication controller is a mountable wireless charging pad that charges electric power by receiving a wireless power signal from the mobile terminal.

* * * * *